(12) United States Patent
Lescoche

(10) Patent No.: US 8,496,118 B2
(45) Date of Patent: Jul. 30, 2013

(54) FILTRATION DEVICE INCLUDING A LOOP AND A CIRCULATION PUMP

(75) Inventor: Philippe Lescoche, Faucon (FR)

(73) Assignee: Societe Industrielle de la Vallee de l'Aigues—S.I.V.A., Nyons (FR)

( * ) Notice: Subject to any disclaimer, the term of this patent is extended or adjusted under 35 U.S.C. 154(b) by 2091 days.

(21) Appl. No.: 11/494,548

(22) Filed: Jul. 28, 2006

(65) Prior Publication Data
US 2007/0023340 A1 Feb. 1, 2007

(30) Foreign Application Priority Data
Jul. 29, 2005 (FR) ...................................... 05 08131

(51) Int. Cl.
*B01D 29/00* (2006.01)
*B01D 29/52* (2006.01)
(52) U.S. Cl.
USPC ................ 210/416.1; 210/323.2; 210/321.79; 210/321.88; 210/433.1; 210/87; 210/189; 210/195.2; 210/321.63; 210/651; 210/652
(58) Field of Classification Search
USPC ............... 210/321.63, 195.2, 651, 652, 416.1
See application file for complete search history.

(56) References Cited

U.S. PATENT DOCUMENTS

| 4,702,842 | A | * | 10/1987 | Lapierre | ....................... 210/651 |
| 6,059,970 | A | * | 5/2000 | Kohlheb et al. | ............. 210/321.6 |
| 6,547,965 | B1 | | 4/2003 | Chancellor | |
| 2004/0007517 | A1 | * | 1/2004 | Grangeon et al. | ......... 210/323.2 |

FOREIGN PATENT DOCUMENTS

| JP | 10-109022 | 4/1998 |
| WO | 01/96003 A1 | 12/2001 |

* cited by examiner

*Primary Examiner* — Dirk Bass
(74) *Attorney, Agent, or Firm* — Clark & Brody

(57) ABSTRACT

A device for the tangential filtration of a fluid to be processed and intended to be divided into a filtrate and a retentate includes, in an outer case, a series of filtration elements of tubular form lying parallel to each other, at least one output for the filtrate, communicating with the filtrate collection receptacle, a first communication chamber in which are fitted the separation resources, communicating with respectively a first series and a second series of filtration elements forming the go and return circuits of a circulation loop for the fluid to be processed, where the separation resources include a turbine of a circulation pump. The input for the fluid to be processed opens into the first communication chamber of the outer case between the turbine of the circulation pump and the filtration elements of the series forming the return circuit of the circulation loop.

23 Claims, 1 Drawing Sheet

FILTRATION DEVICE INCLUDING A LOOP AND A CIRCULATION PUMP

This present invention concerns the technical area of particulate or molecular separation employing separation elements generally known as membranes, designed to perform the separation of the molecules or particles contained in a fluid medium to be processed. The subject of the invention finds a particularly advantageous application in the area of filtration, in the general sense, of a fluid medium to be processed, and in particular of nanofiltration, ultrafiltration, microfiltration, etc.

From previous designs, we are familiar with many implementation variants of a filtration installation for a fluid to be processed. For example, a filtration installation includes at least one, and generally two filtration devices each with, in an envelope, a series of filtration elements of tubular form lying parallel to each other, and mounted at each of their ends on a positioning plate. Each filtration element includes at least one circulation channel for the fluid to be processed. The filtration elements perform tangential filtration of the fluid with a view to obtaining, at the peripheral surface of the filtration elements, the discharge of the filtrate intended to be recovered in a collection receptacle located between the positioning plates and the envelope.

The two filtration devices are fitted in series within a circulation loop in which a circulation pump is connected to the filtration devices by means of a feed pipe for the fluid to be processed and a return pipe recovering the fluid which has circulated within the filtration elements and which is called the retentate. The circulation pump is used to perform the circulation of the fluid to be processed at high speed within the filtration elements, tending to generate a shear stress which re-disperses the materials deposited on the surface of the membrane channels. It should be considered that this unclogging principle is effected within a circulation loop which includes two filtration devices fitted in series, and the feed and return pipes of the fluid to be processed. This installation works satisfactorily in terms of fluid processing. However such an installation has relatively high production costs because of the creation of a circulation loop necessitating the implementation of various pipes and couplings. Moreover, such an installation is also relatively bulky.

To try to overcome these drawbacks, patent application EP 0 217 568 proposes a filtration device with a series of filtration elements of tubular form lying parallel to each other in an outer case, passing through a positioning plate at each of their ends in a sealed manner. The filtration elements each include at least one circulation channel for the fluid to be processed, and perform the filtration of the said fluid with a view to obtaining, at the peripheral surface of the filtration elements, the discharge of the filtrate intended to be recovered in a collection receptacle located between the positioning plates and the outer case. One of the ends of the filtration elements opens into a communication chamber which provides the communication between a go circuit and a return circuit for the fluid to be processed, flowing in two distinct series of filtration elements. This built-in circulation loop is connected on the outside to a circulation pump for the fluid to be processed. Such a device thus requires a coupling to an external circulation pump, which increases its production cost and its size.

Patent application WO 01/96 003 aims to propose a filtration device that includes a circulation pump in the circulation loop. Such a filtration device includes a separation piece fitted in a first communication chamber into which one of the ends of the filtration elements opens, while the other end of the filtration elements opens into a second communication chamber. The turbine of a circulation pump is fitted within the separation piece, which divides the membranes into a first and a second series forming the go and return circuits of a circulation loop.

The second communication chamber includes the input and the output for the fluid to be processed, which passes through the membranes of a series forming the go circuit, under the suction effect of the pump. The pump drives the fluid which has passed through the first series toward the membranes of the series forming the return circuit.

Such a device can have a drawback in certain operating conditions. Working on the principle that the value of the pressure drop in each go or return circuit, because of the speed of circulation of the fluid, is equal to $\Delta P$, the circulation pump adds twice the pressure drop (go and return circuit) to the value of the feed pressure Pa to effect the circulation of the fluid in the circulation loop. The pressure at the output of the go circuit, which is also the suction of the circulation pump, is equal to Pa−$\Delta P$. At the feed side of the circulation pump, the pressure is equal to Pa+$\Delta P$. It should be noted that the pressure at the intake is equal to Pa−$\Delta P$. In addition, depending on the values of Pa and $\Delta P$, such a pressure at the intake can take a negative value, which means that the filtration elements can draw in the filtrate. This results in an unavoidable loss of efficiency in terms of the quantity of liquid filtered.

Likewise, patent U.S. Pat. No. 4,702,842 describes a filtration appliance equipped with an input for the fluid to be processed which is located between the output of the circulation pump and the input of the go circuit of the circulation loop. Such an appliance thus has the same drawbacks as the filtration device described above. In fact, in the light of this principle, the pressure of the fluid at the input should be greater than the output pressure of the circulation pump, which limits the operation of such an appliance.

The subject of the invention therefore aims to remedy the drawbacks of the previous designs by proposing a device for the tangential filtration of a fluid to be processed, designed to have a low production cost and a limited size, while still retaining a good filtration flow.

In order to meet such an objective, the subject of the invention concerns a device for the tangential filtration of a fluid to be processed, intended to be divided into a filtrate and in a retentate, where the device includes, within an outer case:
- at least one input for the fluid to be processed,
- at least one output for removal of the retentate,
- a series of filtration elements of tubular form, lying parallel to each other and passing through a positioning plate at each of their ends in a sealed manner, where the filtration elements each has at least one circulation channel for the fluid to be processed and is effecting the filtration of the said fluid, with a view to obtaining, at the peripheral surface of the filtration elements, the discharge of the filtrate intended to be recovered in a collection receptacle located between the positioning plates and the outer case,
- at least one output for the filtrate, communicating with the collection receptacle of the filtrate,
- a first communication chamber into which one of the ends of the filtration elements opens out, and in which separation resources are fitted, in sealed contact with the adjoining positioning plate, in order to divide the said chamber into first and second volumes, formed respectively inside and outside the separation resources and communicating with a first series and a second series of filtration elements respectively forming the go and return circuits of a circulation loop for the fluid to be processed, where the separation resources have a communicating passage between the second volume and the first volume, inside which is fitted a turbine of a circulation pump, fitted with a drive axle lying outside the first chamber to be connected to a drive motor, and a second communication chamber into which the other of the ends of the filtration elements open, providing a means of communication, for the fluid to be processed, between the filtration elements of the first series and those of the second series.

According to the invention, the input for the fluid to be processed opens into the first communication chamber of the outer case between the turbine of the circulation pump and the filtration elements of the series forming the return circuit of the circulation loop.

According to a first implementation variant, the drive motor of the pump is controlled so that the filtration elements of the second series, fed by the second volume, form the go circuit, while the filtration elements of the first series, opening into the first volume, form the return circuit, and so that the input for the fluid to be processed opens into the first volume of the first chamber between the output of the filtration elements of the first series and the turbine fitted within the separation resources.

According to a second implementation variant, the drive motor of the pump is controlled so that the filtration elements of the first series, fed by the first volume, form the go circuit, while the filtration elements of the second series, opening into the second volume, form the return circuit, and so that the input for the fluid to be processed opens into the second volume of the first chamber formed outside the separation resources between the output of the filtration elements of the second series and the turbine fitted within the separation resources.

Advantageously, the separation resources are fitted within an enclosure for the pump, mounted on a positioning plate.

According to one implementation example, the separation resources include at least one tubular stator, inside which the turbine of the pump is fitted.

Advantageously, the tubular stator is fixed in a sealed manner to the adjoining positioning plate.

Preferably, the tubular stator is extended by a tubular body mounted in a sealed manner on the adjoining positioning plate.

According to another implementation example, the tubular body is equipped with a flange for mounting within the enclosure, where this flange has passages for the fluid.

In a preferred form of implementation, the input for the fluid to be processed includes a tubular element passing through the enclosure and the tubular stator to be accessible outside the outer case and to open into the separation resources.

For example, the input for the fluid to be processed includes a tubular coupling passing through the enclosure to be accessible outside the outer case, and to open outside the separation resources.

According to another characteristic of the invention, the second communication chamber is formed between a closure bottom and the positioning plate not delimiting the first communication chamber, with this second chamber effecting the recovery of the fluid to be processed, which has circulated in the go circuit, and the fluid feed for the return circuit.

For example, the closure bottom, which delimits the second communication chamber, is equipped with the output for removal of the retentate.

According to one implementation example, the positioning plates are connected together by means of a cylinder delimiting the collection receptacle from the filtrate, where the cylinder is equipped with at least one output for the filtrate.

Preferably, the outer case includes the cylinder, the enclosure for the pump and the closure bottom.

According to a preferred implementation example, the separation resources are fitted so that the first and second series of filtration elements include a more or less equal number of filtration elements.

For example, the drive axle is mounted in line with the axis of the cylinder, and so that the drive motor is supported by the enclosure.

According to another implementation variant, the output for removal of the retentate is arranged to communicate with the first communication chamber.

Advantageously, the output for removal of the retentate communicates either with the first volume of the said chamber passing through the enclosure and the separation resources, or with the second volume of the said chamber.

Various other characteristics will emerge from the description provided below, with reference to the appended figures which show, by way of non-limiting examples, forms of implementation and execution of the subject of the invention.

Figure 1:
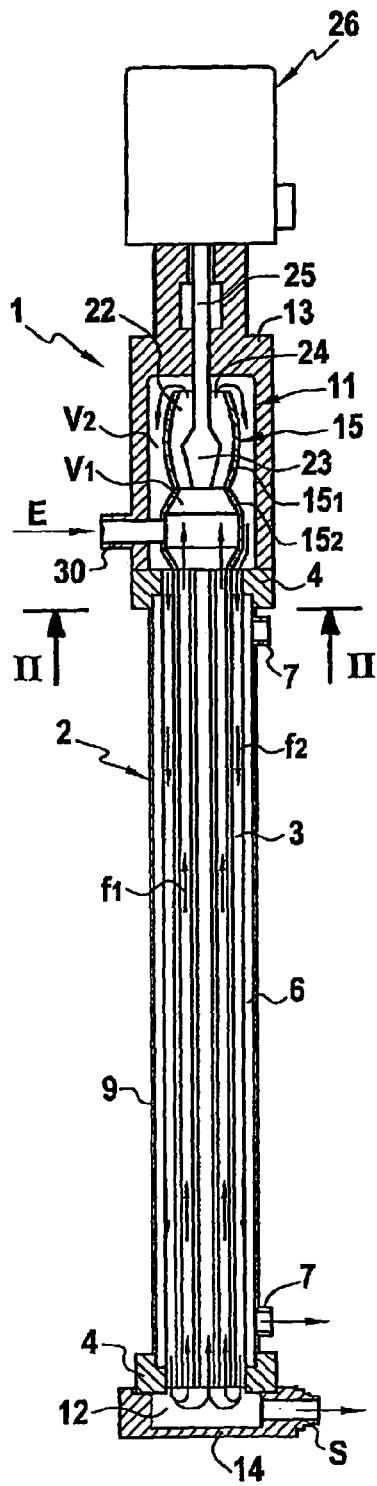
FIG. 1 is a view in longitudinal section of a first implementation example of a device according to the invention.
Figure 2:
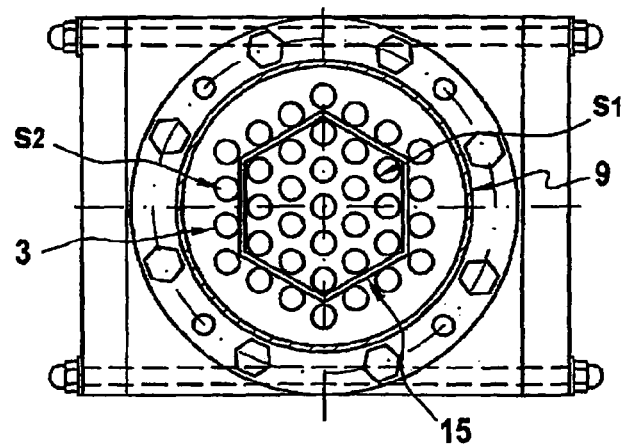
FIG. 2 is a view in cross section seen more or less along lines II-II of FIG. 1.

FIG. 1 and 2 illustrate a device or module 1 performing tangential filtration for a fluid to be processed, which can be of any nature. The device 1 includes, in an outer case 2, a series of filtration elements 3 of tubular form lying parallel to each other. Each filtration element 3 has an external shape of regular cross section, hexagonal or circular for example. Each filtration element 3 includes at least one channel created parallel to the longitudinal axis of the filtration element. The surface of the channels is covered with at least one separating layer, not shown, intended to be in contact with the fluid medium to be processed, flowing within the channels. The nature of the separating layer or layers is chosen according to the power of separation or filtration to be achieved.

The filtration elements 3 are fitted, at each of their ends, onto a positioning plate 4 fitted within the outer case 2. In a conventional manner, each positioning plate 4 includes a hole allowing the passage of the end of a filtration tubular element 3. Each hole is equipped with a sealing gasket used for sealed fitting of the filtration elements 3 on the positioning plates 4. Between themselves and the outer case 2, the positioning plates 4 form a collection receptacle 6 for the filtrate exiting from the peripheral surface of the filtration elements 3. This collection receptacle 6 communicates, via at least one, and in the example illustrated via two outputs 7 for removal of the filtrate. In the example illustrated, each output 7 for the filtrate is composed of a section of pipe connected to a cylinder 9 in part constituting the outer case 2 and at each end of which the positioning plates 4 are fitted. Together with the positioning plates 4, the cylinder 9 thus delimits the collection receptacle 6.

The filtration device 1 also includes a first communication chamber 11 arranged in the outer case 2 and into which opens out, beyond the positioning plate 4, one of the ends of the filtration elements 3, while the other end of the filtration elements 3 opens out beyond the other filtration plate 4, into a second communication chamber 12. As shown more precisely in FIG. 1, the first chamber 11 is formed within a closing enclosure 13 connected to the cylinder 9 and/or to the positioning plate 4, while the second communication chamber 12 is formed between the adjoining positioning plate 4 and a closure bottom 14 mounted on the cylinder 9 and/or the positioning plate 4. Thus, the outer case 2 is composed of the cylinder 9, the enclosure 13 and the closure bottom 14.

The device 1 includes separation resources 15, fitted in the first communication chamber 11 in order to divide this first chamber, firstly, into a first volume $V_1$, communicating with a first series s, of filtration elements 3, conducting the fluid to be processed in a first direction represented by arrow $f_1$ and, secondly, into a second volume $V_2$ communicating with a second series $s_2$ of filtration elements 3 conducting the fluid in a second direction $f_2$ opposite to the first direction $f_1$. The separation resources 15 are fitted in a sealed manner on the adjacent positioning plate 4, so as to divide the volume of the first chamber 11 into a first volume $V_1$ and a second volume $V_2$ located respectively inside and outside the separation resources. It should be understood that the filtration elements 3, belonging to the first series, are different from the filtration elements 3 of the second series $s_2$. According to a preferred implementation characteristic, the separation resources 15 are fitted so that the series $s_1$, $s_2$ of the filtration elements 3 have a more or less equal number of filtration elements 3.

According to this example, the filtration elements 3 belonging to the first series $s_1$ are located within the virtual envelope extending the separation resources 15, while the filtration elements 3 belonging to the second series $s_2$ are located outside this virtual envelope. It should be understood that the filtration elements 3 of the first series $s_1$ and the second series $s_2$ form the go and return circuits of a circulation loop for the fluid to be processed, created within the outer case. In the example illustrated in FIG. 1, the filtration elements of the second series $s_2$ form the go circuit, while the filtration elements of the first series $s_1$ form the return circuit.

The separation resources 15 form an internal housing 22 for a turbine 23 of a circulation pump. The separation resources 15, which will be described in detail in the remainder of the description, come in tubular or cylindrical form and are fitted, in a sealed manner, to the adjoining positioning plate 4. The separation resources 15 form the first volume $V_1$ on the inside, and the second volume $V_2$ on the outside, in relation to the closing enclosure 13, The closing enclosure 13 can be fixed to the positioning plate 4 by means of mounting resources. The separation resources 15 include a communicating passage 24 effecting the passage of the fluid to be processed between the volumes $V_1$, $V_2$. The turbine 23 includes a drive axle 25, connected to a rotating drive motor 26 mounted on the closing enclosure 13. Preferably, the drive axle 25 is mounted in line with the axis of the cylinder 9 in which the filtration elements 3 are distributed regularly along the axis of the cylinder. Of course the closing enclosure 13 includes a sealed passage for the drive shaft 25.

In the example illustrated in FIG. 1, it is considered that the pump drive motor 26 operates in suction mode. The turbine is used, firstly, to draw in the fluid coming from the membranes of the first series s, forming the return circuit and, secondly, to drive the fluid via the communicating passage 24 and the volume $V_2$, in order to feed the membranes of the second series s2 forming the go circuit of the circulation loop.

According to another characteristic of the subject of the invention, the device 2 includes an input E for the fluid to be processed, which opens into the first communication chamber 11 of the outer case between the turbine 23 of the circulation pump and the filtration elements 3 of the series forming the return circuit of the circulation loop, namely the filtration elements of the first series $s_1$ in the example illustrated in FIG. 1.

According to another advantageous characteristic, the second communication chamber 12 is arranged in the closure bottom 14 which, in the example illustrated, is equipped with an output S for removal of the retentate. The second communication chamber 12 is formed by the adjacent positioning plate 4 and provides the communication between the filtration elements 3 of the second series $s_2$ and the filtration elements 3 of the first series $s_1$.

The operation of the device 1, described in FIGS. 1 and 2, flows directly from the above description. The fluid to be processed arrives via the input E in the volume $V_1$ and is drawn up, due to operation of the turbine 23, into the filtration elements 3 of the second series $s_2$ having first passed into volume $V_2$ via the communicating passage 24. The fluid passes through the filtration elements 3 of the second series $s_2$ which thus form the go circuit of the circulation loop to open into the second communication chamber 12 to be distributed, firstly, to the output S for removal of the retentate and, secondly, by the suction effect of the turbine, through the filtration elements 3 of the first series s, which form the return circuit of the circulation loop. The fluid which has circulated through the filtration elements 3 of the first series $s_1$ is recovered in volume $V_1$. The filtration cycle thus continues in accordance with the above description.

In the example illustrated in FIGS. 1 and 2, the input E for the fluid opens into the volume $V_1$ of the first communication chamber 11, located within the separation resources. According to this implementation example, the input E includes a tubular element 30 passing through the enclosure 13, the volume $V_2$ of the communication chamber 11 and the separation resources 15, in order to open into the volume $V_1$ formed within the separation resources 15. According to one implementation example, the separation resources 15 include a stator $15_1$ of tubular form, inside which the turbine 23 is fitted. The separation resources 15 also include a tubular body $15_2$ extending the stator $15_1$, and mounted in a sealed manner not only on the adjoining positioning plate 4 but also on the stator $15_1$. Preferably, this tubular body $15_2$ is fitted with a metal trim on which the turbine rests. This trim thus provides the seal between the stator and the tubular body, as well as the rotation of the turbine. The tubular body $15_2$ has sufficient height to allow the fitting of the tubular element 30 which is mounted radially on the tubular body $15_2$. The tubular element 30 thus opens out within the tubular body $15_2$, between the output of the filtration elements 3 of the first series $s_1$ and the turbine 23 fitted within the separation resources 15, that is to say in the first volume $V_1$.

The tubular element 30 is thus accessible from outside the outer case, so that it can be linked to a connection conduit. It should be noted that the tubular body $15_2$ can be fitted with a flange for mounting in contact with the internal wall of the enclosure 13. This flange, which thus extends radially between the tubular body $15_2$ and the enclosure 13, is fitted with passages for the fluid flowing within the volume $V_2$.

In the previous example, the pump draw in the fluid through the filtration elements of the first series $s_1$ and discharge the fluid through the filtration elements of the second series $s_2$. Of course, by reversing the direction of rotation of the turbine, the fluid can be drawn in through the filtration elements 3 of the second series $s_2$ and then driven through the filtration elements 3 of the first series $s_1$.

Figure 3:
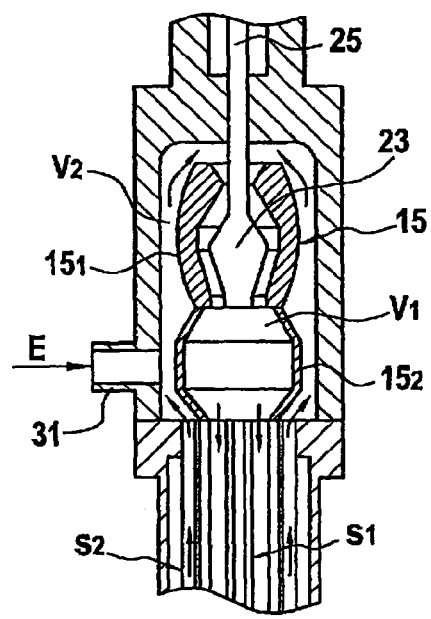
FIG. 3 is a view in partial elevation section of a second implementation example of a device according to the invention.

According to this implementation variant illustrated in FIG. 3, the filtration elements 3 of the first series $s_1$ are fed via the first volume $V_1$, thus forming the go circuit of the circulation loop. On leaving the filtration elements 3 of the first series s1, the fluid is distributed firstly to the output S for removal of the retentate, and secondly to the filtration elements 3 of the second series $s_2$ which form the return circuit. The fluid enters into the second volume $V_2$ on leaving the filtration elements 3 of the second series $s_2$.

In this implementation example, the input E of the fluid opens into the second volume $V_2$, that is to say between the turbine 23 and the filtration elements 3 of the second series $s_2$ forming the return circuit of the circulation loop. Thus, the fluid of the second volume $V_2$, coming from the input E and from the output of the filtration elements of the second series $s_2$ is drawn in the turbine 23 via the communicating passage 24.

In one or other of these implementation examples, the input E of the fluid to be processed is located upstream of the turbine 23 of the circulation pump. In these conditions, the pressure at the input E can be less than the output pressure of the circulation pump.

In the implementation example illustrated in FIG. 3, the input E for the fluid to be processed includes a tubular coupling 31 passing through the enclosure 13, to be accessible from outside the outer case and to open outside of the separation resources 15. In the example illustrated, the separation resources include the stator $15_1$ and the tubular body $15_2$. It should be noted that the tubular body $15_2$ can be omitted in this implementation variant.

In the example illustrated in FIG. 1, the output for removal of the retentate S communicates with the second communication chamber 12. It should be noted that this output for removal of the retentate S can be arranged to communicate with the first communication chamber 11 into which the input E of the fluid to be processed also emerges. In the example illustrated in FIG. 1, the output for removal of the retentate S can pass through either the enclosure 13 to open into the second volume $V_2$, or the enclosure 13 and the tubular body $15_2$ to open into the first volume $V_1$ either opposite to the input E or not. In the example illustrated in FIG. 3, the output for removal of the retentate S can pass through the enclosure 13 to open into the second volume $V_2$, either opposite to the input E or not.

The invention is not limited to the examples described and illustrated, since various modifications can be made to it without moving outside of its scope.

The invention claimed is:

1. A device for the tangential filtration of a fluid to be processed, intended to be divided into a filtrate and a retentate, where the device includes, in an outer case (2):
    at least one input (E) for the fluid to be processed,
    at least one output (S) for removal of the retentate,
    a series of filtration elements (3) of tubular form lying parallel to each other and passing through a positioning plate (4) in a sealed manner at each of their ends, where the filtration elements (3), each with at least one circulation channel for the fluid to be processed and effecting the filtration of the said fluid, with a view to obtaining, at the peripheral surface of the filtration elements, the discharge of the filtrate intended to be recovered in a collection receptacle (6) located between the positioning plates (4) and the outer case (2), have:
    least one output (7) for the filtrate, communicating with the filtrate collection receptacle (6),
    a first communication chamber (11) into which one of the ends of the filtration elements opens, and in which separation resources are fitted (15) in sealed contact with the adjacent positioning plate (4), in order to divide the said chamber into first ($V_1$) and second ($V_2$) volumes respectively formed inside and outside of the separation resources and communicating respectively with a first series ($s_1$) and a second series ($s_2$) of filtration elements (3) forming go and return circuits of a circulation loop for the fluid to be processed, where the separation resources include a communicating passage (24) between the second volume ($V_2$) and the first volume ($V_1$), inside which is fitted a turbine (23) of a circulation pump, fitted with a drive axle (25) lying outside the first chamber (11) to be connected to a drive motor (26),
    and a second communication chamber (12) into which opens the other end of the filtration elements, providing a communication path for the fluid to be processed, between the filtration elements of the first series ($S_1$) and those of the second series ($s_2$), characterized in that the input (E) for the fluid to be processed opens into the first communication chamber (11) of the outer case upstream of the turbine (23) and between the turbine (23) of the circulation pump and the filtration elements (3) of the series forming the return circuit of the circulation loop.

2. A device according to claim 1, characterized in that the drive motor of the pump is controlled so that the filtration elements (3) of the second series ($s_2$), fed by the second volume ($V_2$) form the go circuit, while the filtration elements (3) of the first series ($S_1$) opening into the first volume ($V_1$) form the return circuit, and so that the input (E) for the fluid to be processed opens into the first volume ($V_1$) of the first chamber (11) between the output of the filtration elements of the first series ($S_1$) and the turbine (23) fitted within the separation resources (15).

3. A device according to claim 1, characterized in that the drive motor of the pump is controlled so that the filtration elements (3) of the first series ($S_1$), fed by the first volume ($V_1$), form the go circuit, while the filtration elements (3) of the second series ($s_2$), opening into the second volume ($V_2$), form the return circuit, and so that the input (E) for the fluid to be processed opens into the second volume ($V_2$) of the first chamber formed outside the separation resources (15) between the output of the filtration elements (3) of the second series ($s_2$) and the turbine (23) fitted within the separation resources (15).

4. A device according to claim 1, characterized in that the separation resources (15) are fitted within an enclosure (13) for the pump, mounted on a positioning plate (4).

5. A device according to claim 1, characterized in that the separation resources (15) include at least one tubular stator ($15_1$), inside which is fitted the turbine (23) of the pump.

6. A device according to claim 5, characterized in that the tubular stator ($15_1$) is fixed in a sealed manner onto the adjoining positioning plate (4).

7. A device according to claim 5, characterized in that the tubular stator ($15_1$) is extended by a tubular body ($15_2$) mounted, in a sealed manner, on the adjoining positioning plate (4).

8. A device according to claim 7, characterized in that the tubular body ($15_2$) is equipped with a flange for mounting within the enclosure (13), where this flange has passages for the fluid.

9. A device according to claim 2, characterized in that the input (E) for the fluid to be processed includes a tubular element (30) passing through the enclosure (13) and the tubular stator ($15_1$) to be accessible outside the outer case and to open into the separation resources (15).

10. A device according to claim 3, characterized in that the input (E) for the fluid to be processed includes a tubular coupling (31) passing through the enclosure (13) to be accessible outside the outer case and to open outside the separation resources (15).

11. A device according to claim 1, characterized in that the second communication chamber (12) is formed between a closure bottom (14) and the positioning plate not delimiting the first communication chamber (11), where this second chamber (12) effects the recovery of the fluid to be processed, which has circulated in the go circuit and the fluid feed for the return circuit.

12. A device according to claim 11, characterized in that the closure bottom (14), which delimits the second communication chamber (12), is equipped with the output (S) for removal of the retentate.

13. A device according to claim 1, characterized in that the positioning plates (4) are connected together by means of a cylinder (9) delimiting the filtrate collection receptacle (6), where the cylinder (9) is equipped with at least one output (7) for the filtrate.

14. A device according to claim 4, characterized in that the outer case includes the cylinder (9), the enclosure (13) for the pump, and the closure bottom (14).

15. A device according to claim 1, characterized in that the separation resources (15) are fitted so that the first and second series ($S_1$, $S_2$) of filtration elements (3) include a more or less equal number of filtration elements (3).

16. A device according to claim 1, characterized in that the drive axle (25) is mounted in line with the axis of the cylinder (9) and so that the drive motor (26) is supported by the enclosure (13).

17. A device according to claim 1, characterized in that the output (S) for removal of the retentate is arranged to communicate with the first communication chamber (11).

18. A device according to claim 17, characterized in that the output (S) for removal of the retentate communicates either with the first volume ($V_1$) of the first chamber (11) passing through the enclosure (13) and the separation resources (15), or with the second volume ($V_2$) of the said first chamber.

19. A device according to claim 4, characterized in that the input (E) for the fluid to be processed includes a tubular element (30) passing through the enclosure (13) and the tubular stator ($15_1$) to be accessible outside the outer case and to open into the separation resources (15).

20. A device according to claim 5, characterized in that the input (E) for the fluid to be processed includes a tubular element (30) passing through the enclosure (13) and the tubular stator ($15_1$) to be accessible outside the outer case and to open into the separation resources (15).

21. A device according to claim 4, characterized in that the input (E) for the fluid to be processed includes a tubular coupling (31) passing through the enclosure (13) to be accessible outside the outer case and to open outside the separation resources (15).

22. A device according to claim 11, characterized in that the outer case includes the cylinder (9), the enclosure (13) for the pump, and the closure bottom (14).

23. A device according to claim 13, characterized in that the outer case includes the cylinder (9), the enclosure (13) for the pump, and the closure bottom (14).

* * * * *